United States Patent [19]
Di Padova et al.

[11] 3,752,379
[45] Aug. 14, 1973

[54] INTERCHANGEABLE ENDLESS LOOP MAGNETIC TAPE CARTRIDGES

[75] Inventors: Sergio Di Padova; Pietro Musso, both of Ivrea, Italy

[73] Assignee: Ing. C. Olivetti & C., S.p.A., Turin, Italy

[22] Filed: Feb. 15, 1972

[21] Appl. No.: 226,444

[30] Foreign Application Priority Data

Feb. 16, 1971 Italy .............................. 67513 A/71

[52] U.S. Cl. .......................... 226/119, 179/100.2 Z
[51] Int. Cl. .......................................... B65h 17/42
[58] Field of Search ..................... 274/4 G; 226/118, 226/119, 89; 179/100.2 Z

[56] References Cited

UNITED STATES PATENTS

| | | | |
|---|---|---|---|
| 3,563,435 | 2/1971 | Whitehead | 226/118 |
| 3,543,983 | 12/1970 | Dale | 226/118 |
| 3,464,611 | 9/1969 | Verdone | 226/119 |
| 3,265,817 | 8/1966 | Gilman | 179/100.2 Z |
| 3,534,894 | 10/1970 | Bretti | 226/182 |

*Primary Examiner*—Allen N. Knowles
*Attorney*—Kevin McMahon et al.

[57] ABSTRACT

An interchangeable endless loop magnetic tape cartridge is provided with a first compartment for storing the bulk of the tape and a second compartment containing the driving means and magnetic head. The first compartment is provided with a curved inner surface to reduce the amount of tape rubbing against the walls of the first compartment. Access to the second compartment is provided by a finger which protrudes into the center of the second compartment which reduces the tendency of the tape to become electrostatically attracted to adjacent convolutions and to the walls and thus reduce tape tension between the driving means and tape head.

The tape driving means include pinch rollers which extend beyond the width of the magnetic tape for improving the frictional contact therebetween.

2 Claims, 4 Drawing Figures

INTERCHANGEABLE ENDLESS LOOP MAGNETIC TAPE CARTRIDGES

BACKGROUND OF THE INVENTION

The present invention relates to an improvement in interchangeable cartridges for magnetic tape memories of the endless loop type comprising a first compartment containing the bulk of the tape loop and a second compartment containing the playback and recording heads and tape driving system, said compartments being divided by a wall having an access opening into the second compartment for the tape and an exit opening for the tape to be fed back into the first compartment.

Magnetic tape cartridges for recording and playback of endless tape loops are well-known in the art. Generally, they consist of a tape storage section and a section in which the tape drive means and magnetic read/write heads are located, the sections being divided by a wall having access openings to the respective sections provided at each end of the wall. The tape storage section is usually of a rectangular configuration which causes the bulk of the tape to form itself into a plurality of loops which have a rather high average length between each bend. Furthermore, the tape loops take on a zig-zag configuration which causes the tape to accumulate near the access opening to the tape drive and magnetic head section. The magnetic tape under these circumstances is placed under tension between said access opening and the magnetic head which often results in distortion errors during recording or playback or even breakage of the tape itself. Also, due to the rectangular shape of the storage section the tape rubs against the walls and is subject to picking up electrostatic charges causing the loops to become attracted to adjacent loops and thus further accumulating in a mass near said access opening.

SUMMARY OF THE INVENTION

It is an object of this invention to solve the technical problem of eliminating the rubbing of the magnetic tape against the walls of the storage section as well as eliminating the accumulating of the tape at the access opening to the magnetic head and tape drive section and the elimination of tension between the magnetic head and the access opening.

This technical problem is solved in the interchangeable endless loop magnetic tape cartridge for memories which is characterized in that said first aperture is disposed on a member which protrudes from said wall towards the center portion of said first compartment, said first compartment having a configuration such that it creates, in correspondence with said first opening, a zone of reduced density of loops of tape.

BRIEF DESCRIPTION OF THE DRAWINGS

A preferred embodiment of the invention is set forth by way of example from the following description and accompanying drawings, in which.

DESCRIPTION OF A PREFERRED EMBODIMENT

Figure 2:
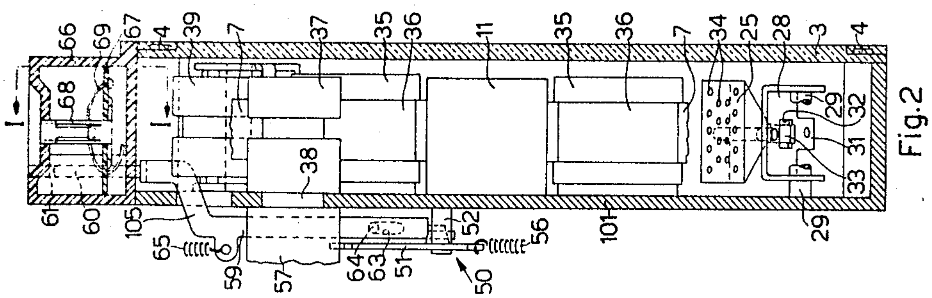
FIG. 2 is a sectional view of the cartridge taken along line II—II of FIG. 1.

The cartridge has a generally rectangular configuration and comprises a container 1 (FIG. 1) having a base 101 attached to four walls 2. The container 1 is covered by a protective sheet 3 (FIG. 2) of plastic fastened by screws to the walls 2. The container 1 (FIG. 1) is provided with a wall 5 which divides the container into a first compartment 6 containing the bulk of the magnetic tape loop 7 and a second compartment 9 which contains that part of the tape loop 7 passing through the driving means 10 for cooperation with the recording and playback magnetic head 11.

The portion of tape 7 in compartment 6 is arranged in folds having convolutions 8, the distribution and density of which is governed by the shape of the walls of compartment 6 and the length of the tape loop 7.

Compartment 6 is provided with a portion which is substantially rectangular. The walls 2 are formed, moreover, to create three corners 12 of the compartment 6 in the shape of smooth tangential arcs between the straight portions of the walls 2, while the fourth corner 13 is formed with an aperture 14 for the exit of the tape from compartment 9. Aperture 14 is extended in a curved channel 14′ tangential to the portion of wall 2 adjacent to the fourth corner 13.

The wall 5 includes a first portion 5′ which extends approximately one half of the length of the cartridge 1 parallel to the two walls 2 of greater length. Wall 5 includes a further portion 5″, slightly inclined with respect to portion 5′ which extends into a finger portion 17 protruding towards the center of compartment 6 to a point where, due to the particular shape of said compartment, as described above, the density of the tape convolutions 8 is greatly reduced. The finger portion 17 is provided with an opening 15 through which the tape enters compartment 9. Opening 15 is formed by the two converging walls of finger portion 17.

The shape of finger 17 permits the movement of a length of tape 18 towards the opening 15 separated from portion 5″ of the wall 5 and from adjacent convolutions of the tape and therefor the tendency for the tape to become electrostatically attracted to other convolutions or to the walls of the compartment is greatly minimized.

The two converging walls 16 of finger 17 form therebetween a space 19 in which a guide roller 20 is mounted for guiding the tape towards a channel 21 formed by portions 5′ and 5″ of wall 5 and by the edge 102 of a rib 103 disposed parallel to portions 5′ and 5″. Within channel 21 the tape is substantially free of tension and is able to dampen considerably any possible vibrations created at the aperture 15.

The tape is further guided within channel 21 by a fixed cylindrical pin 22 mounted at the junction of wall portions 5′ and 5″. A second roller 23 is provided at the end of channel 21 and serves to guide the tape around toward a brake 24. Brake 24, in conjunction with driving means 10, operates to maintain constant tension in the tape as it passes over the magnetic head 11.

Brake 24 comprises a metallic shoe 25 and a felt pad 26 between which the magnetic tape 7 is drawn. The pad 26 is fixed to rib 103 while the shoe 25 is rotatable about a shaft 27 fixed to a lever 28 in such a manner as to orient itself with respect to pad 26 to follow any undulations of the tape. The movements of the shoe 25 around shaft 27 are limited by an aperture 32 (FIG. 2) provided on lever 28 into which a pin 33 fixed to the shoe is inserted. Lever 28 is pivoted on pin 29 which is located on the side from which tape 7 is fed with respect to lever 28 and is fixed to the base of container 1. Thus brake shoe 25 is disposed substantially parallel to tape 7. Brake 24 is biased against tape 7 and felt pad 26 by a spring 30 fixed at one end to an extension 31 of lever 28 and at the other end to the container. The brake shoe 25 (FIG. 2) is further provided with holes which permit particles of oxide which rub off the magnetic tape as a result of wear to be disposed which would otherwise damage the magnetic head because of their abrasive nature.

Magnetic head 11 is placed between two rollers 35 (FIG. 1) pivoted respectively on two corresponding shafts secured to the container 1. The surfaces of rollers 35 are provided with an annular cut-away portion 36 having a width substantially equal to the width of the magnetic tape. Thus the tape 7 moves entirely within the annular cut-away portion and is thus prevented from undergoing movement or oscillations along its longitudinal axis which would cause recording or playback errors or distortion by magnetic head 11.

The driving means 10 for tape 7 include a drive roller 37 pivoted on a shaft 38 which is rotatable around the base portion 101 of container 1 and extends therethrough for coupling to a motor in the manner disclosed, by way of example, in U.S. Pat. No. 3,534,894, issued Oct. 20, 1970, and owned by the assignee of the present application. To reduce friction of the drive roller 37 at the point where shaft 38 passes through the base 101 of the container 1 a rolling-contact type bearing may be provided in the well-known manner.

Figure 3:
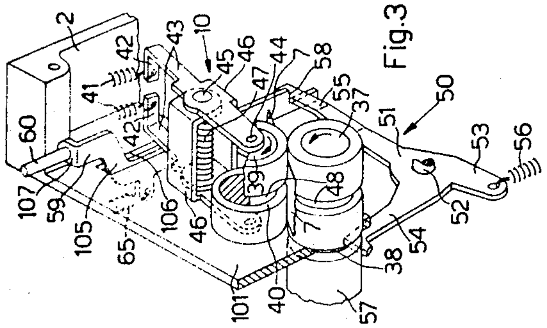
FIG. 3 is a perspective view of a detail of the cartridge.

The tape 7 is continually pressed against the drive roller 37 by a pinch roller 39 which is covered by a layer 40 of material having a high frictional coefficient, for example, rubber or similar materials. The pinch roller 39 rotates on a shaft 44 held by two symmetrical levers 43 and is biased against the drive roller 37 by means of two springs 41 (FIG. 3), each having one end fixed to the container and the respective other ends fixed to a bent tab 42 of the corresponding lever 43. The two levers 43 are pivoted on a shaft 45 which permits each lever to rotate independently of the other. This movement assures a constant pressure between the two rollers even in case of deformity of their surfaces or the presence of undulations in the tape. In addition the two lever arms 43 are made of thin flexible material capable of undergoing slight longitudinal and torsional deflections thereby permitting shaft 44 to tilt from its normal axis and thus the two rollers 37, 39 can always be in full surface contact with each other.

The two levers 43 are each joined to a bracket 46 which is provided with a perpendicular tab for engaging shaft 45. A compression spring 47 is wound around shaft 45 between the tab portions of brackets 46 and serves to urge the two levers 43 towards each other preventing the end of shaft 44 from dislodging from the seats formed on levers 43.

The tape 7 is driven by the two rollers 37 and 39 by means of friction between the driving and driven parts. Rollers 37 and 39 have a width which is substantially double the width of the tape 7. Due to the elastic deformation of the rubber layer 40 with which the pinch roller 39 is covered, the extremities of the two rollers not in contact with the tape are in direct contact with each other. This arrangement permits the rotational motion to be directly transmitted between drive roller 37 and pinch roller by frictional force and not through the tape itself which might become deformed.

When the cartridge is removed from its associated drive mechanism (not shown) a locking mechanism 50 becomes which serves to completely block the accidental rotation of the drive roller 37 in a direction opposite the normal direction of motion. Were such motion not prevented, the tape would accumulate within the second compartment 9 (FIG. 1), not being able to return to the first compartment 6 due to the blocking action of brake 24.

Locking mechanism 50 (FIG. 3) includes a rocker arm 51 pivoted on pin 52 fixed to the base 101 of container 1. The rocker arm 51 is provided with an extension 53 and two substantially perpendicular arms 54 and 55. A spring 56 fixed at one end to extension 53 and at the other end to the container, urges the rocker arm 51 in a counterclockwise direction and thus maintains the end of arm 54 in contact with a shaft coupling 57 made of high friction material fixed to shaft 38 thereby blocking accidental rotation of the drive roller in a contrary direction.

Figure 1:
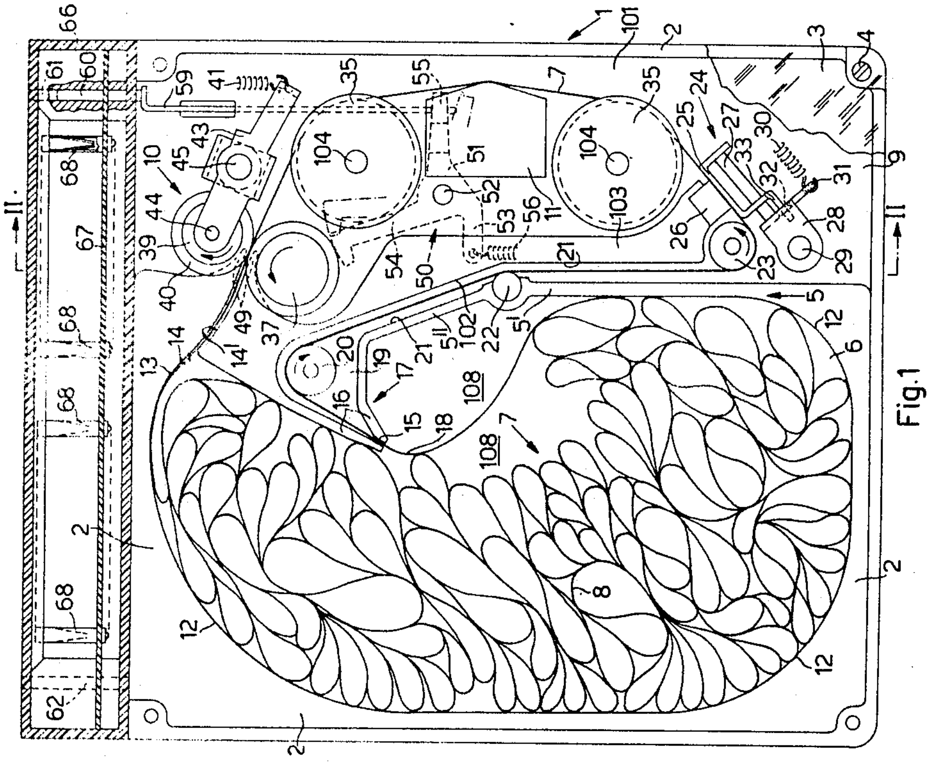
FIG. 1 is a front view, partially in section, showing an interchangeable endless loop magnetic tape cartridge for memories according to the invention.

Arm 55, in turn, cooperates with shoulder 58 of a rod 59. This arm is provided with a bend 105 which passes through a slit 106 in the base 101 and terminates in a bent tab 107 on which is fastened a pin 60 which extends through a guide opening 61 (FIG. 1). The opening 61 serves, in conjunction with a second opening 62, for connecting the cartridge mechanically to the associated utilization apparatus in a well-known manner.

Rod 59 (FIG. 2) is further provided with a slit 63 which cooperates with a pin 64 fastened to container 1 for guiding the rod 59. A spring 65 having one end attached to rod 59 and the other end fixed to the container 1 normally urges the rod 59 towards the upper portion of the cartridge for a purpose to be described as follows.

When the cartridge is inserted into its associated utilization apparatus, two guide pins (not shown) enter holes 61 and 62 (FIG. 1) and pin 60 is pushed towards the base 101 together with rod 59. This causes by means of shoulder 59 (FIG. 3) the rocker arm 51 to turn in a clockwise direction, freeing the drive roller 37.

Drive roller 37 (FIG. 1) is then selectively rotated counterclockwise by the driving mechanism to thereby advance the tape 7 past the magnetic head 11. To this end the drive roller 37 in cooperation with pinch roller 39 pulls the tape 7 which due to the braking action of brake 24 and contact with the magnetic head 11 keeps the tape in constant tension. The tape 7 reaches the brake 24 after entering aperture 15 and passing around rollers 20 and 23. Between these two rollers the tape 7 passes through channel 21 where the tape is practically tension-free thereby damping any vibrations in the tape which may have been created at the mouth of aperture 15. The channel 21 also keeps the portion of the tape therein from contacting other portions of the tape loop and from touching any of the walls of the container 1.

Furthermore, rollers 37 and 39 push the tape 7 through channel 14' and exit opening 14 back into storage compartment 6. The tape follows the gently curved walls 13 and 12 which help to create convolutions in the tape of a small average length with respect to the width of compartment 6. The curved tangential surfaces 12 and protruding finger 17 serve to cause the circular convolutions of the tape to accumulate along the walls 2 such that a zone 108 is created at the center of the compartment 6 having a reduced density of tape. The portion 18 of tape which is being fed through aperture 15 is thus located in the low-density zone 108 thereby insuring that the tape enters the aperture 15 gently.

The cartridge is provided on its upper part with an assembly 66 (FIGS. 1 and 2) comprising a group of female electrical connectors 68 for connection with associated male connectors (not shown) on the utilization apparatus when the cartridge is mounted. The assembly 66 includes a layer of insulating material 67 having a printed circuit thereon to which the metallic connectors 68 (FIG.1) are soldered by means of feet 71 at the base. Wire leads 69 (FIG. 2) are connected between the connectors 68 and magnetic head 11 thereby permitting the head to be electrically connected externally of the cartridge.

Figure 4:
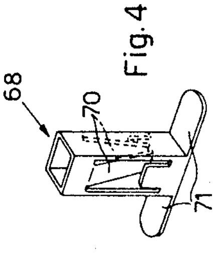
FIG. 4 is a perspective view of another detail of the cartridge.

Each connector 68 (FIG. 4) is hollow and tubular in shape and includes two resilient tabs 70 bent towards the interior of the tube. The tubes 68 permit a simple and efficient electrical connnection with the utilization equipment.

While the invention has been described and illustrated in detail it is to be understood that many modifications and variations of the present invention will be apparent to those skilled in the art and that the scope of the invention is to be measured solely by the appended claims.

We claim:

1. An interchargeable endless loop magnetic tape cartridge comprising:

a substantially rectangular first compartment having three of its corners connected by curved tangential surfaces for containing tape arranged in convolutions;

a second compartment containing means for recording and reading said tape, means for driving said tape and guide means for guiding said tape through said recording, reading and driving means;

a partition separating said compartments including two converging parts defining a first opening for guiding the tape into said second compartment, said two converging parts being disposed proximate the fourth corner of said first compartment and protruding therefrom towards the opposite corner of said first compartment; and a second opening for guiding the tape out of said second compartment, said second opening comprising a curved channel tangent with the shorter side of said first compartment at said fourth corner thereof, said guiding means including a tape guide roller disposed in the area defined by said two converging parts and a channel disposed substantially parallel to said partition, said guiding means leading said tape initially from said first opening towards said fourth corner of said first compartment and thence into said parallelly disposed channel for rendering the portion of the tape in said channel substantially tension-free to dampen any vibrations created during feeding, said first compartment having a shape such that in correspondence with said first opening an area of reduced density of said convolutions of tape is created.

2. A cartridge as set forth in claim 6 wherein said guide means further include brake means cooperating with said driving means to maintain the portion of the tape in contact with said recording and reading means under tension, said brake means comprising a spring-loaded lever disposed substantially parallel to the longitudinal axis of the tape, the fulcrum of said lever being disposed on the side from which the tape is fed and a brake shoe coupled to said lever.

* * * * *